US008033300B2

(12) United States Patent
McCarty

(10) Patent No.: US 8,033,300 B2
(45) Date of Patent: Oct. 11, 2011

(54) FLUID PRESSURE REDUCTION DEVICES

(75) Inventor: Michael Wildie McCarty, Marshalltown, IA (US)

(73) Assignee: Fisher Controls International, LLC, St. Louis, MO (US)

( * ) Notice: Subject to any disclaimer, the term of this patent is extended or adjusted under 35 U.S.C. 154(b) by 0 days.

(21) Appl. No.: 12/869,411

(22) Filed: Aug. 26, 2010

(65) Prior Publication Data

US 2010/0319799 A1    Dec. 23, 2010

Related U.S. Application Data

(63) Continuation of application No. 11/405,777, filed on Apr. 18, 2006, now Pat. No. 7,802,592.

(51) Int. Cl.
*F15D 1/04* (2006.01)
(52) U.S. Cl. .......... 138/42; 138/43; 137/625.3; 251/127
(58) Field of Classification Search .................. 138/42, 138/43, 46; 137/625.3, 625.37; 251/127
See application file for complete search history.

(56) References Cited

U.S. PATENT DOCUMENTS

| | | | |
|---|---|---|---|
| 1,243,134 A | 10/1917 | Binckley | |
| 1,650,196 A | 11/1927 | Demuth | |
| 2,126,991 A | 8/1938 | Griswold | |
| 3,133,557 A | 5/1964 | Gongwer | |
| 3,316,936 A | 5/1967 | Gongwer | |
| 3,323,550 A | 6/1967 | Lee, II | |
| 3,375,855 A | 4/1968 | Deeks | |
| 3,451,404 A | 6/1969 | Self | |
| 3,513,864 A | 5/1970 | Self | |
| 3,514,074 A | 5/1970 | Self | |
| 3,529,628 A | 9/1970 | Cummins | |
| 3,532,126 A | 10/1970 | Boothe | |
| 3,631,891 A | 1/1972 | Brumm | |
| 3,678,963 A | 7/1972 | Betts et al. | |
| 3,688,800 A | 9/1972 | Hayner et al. | |
| 3,722,854 A | 3/1973 | Parola | |
| 3,780,767 A | 12/1973 | Borg et al. | |
| 3,802,537 A | 4/1974 | White | |
| 3,813,079 A | 5/1974 | Baumann et al. | |

(Continued)

FOREIGN PATENT DOCUMENTS

DE    2514879    * 10/1976

(Continued)

OTHER PUBLICATIONS

Chinese Intellectual Property Office issued on Feb. 12, 2010, The First Office Action (English Translation) in Chinese patent application No. 200780013828.9, 7 pages.

(Continued)

*Primary Examiner* — Patrick F Brinson
(74) *Attorney, Agent, or Firm* — Hanley, Flight & Zimmerman, LLC

(57) ABSTRACT

An example fluid pressure reduction device includes a plurality of nested cylinders forming a hollow structure comprising an inner surface and an outer surface. The device also includes a plurality of passageways extending between the inner and outer surfaces through the nested cylinders. At least one of the cylinders includes first apertures substantially differently shaped from second apertures in a second one of the cylinders. At least one of the first apertures has a first wetted perimeter that is greater than a second wetted perimeter of another aperture having the same area as the at least one of the first apertures.

16 Claims, 10 Drawing Sheets

U.S. PATENT DOCUMENTS

| | | | |
|---|---|---|---|
| 3,856,049 A | 12/1974 | Scull | |
| 3,894,716 A | 7/1975 | Barb | |
| 3,899,001 A | 8/1975 | Orme | |
| 3,908,698 A | 9/1975 | Baumann | |
| 3,917,221 A | 11/1975 | Kubota et al. | |
| 3,921,668 A | 11/1975 | Self | |
| 3,941,350 A | 3/1976 | Kluczynski | |
| 3,954,124 A | 5/1976 | Self | |
| 3,971,411 A | 7/1976 | Baumann | |
| 3,978,891 A | 9/1976 | Vick | |
| 3,995,664 A | 12/1976 | Nelson | |
| 4,024,891 A | 5/1977 | Engel et al. | |
| 4,060,099 A | 11/1977 | Bates, Jr. | |
| 4,068,683 A | 1/1978 | Self | |
| 4,079,754 A | 3/1978 | Porter | |
| 4,103,534 A | 8/1978 | Hoof | |
| 4,105,048 A | 8/1978 | Self | |
| 4,125,129 A | 11/1978 | Baumann | |
| 4,127,146 A | 11/1978 | Self | |
| 4,221,037 A | 9/1980 | Seger | |
| 4,249,574 A * | 2/1981 | Schnall et al. | 137/625.3 |
| 4,258,750 A * | 3/1981 | Schnall et al. | 137/625.3 |
| 4,267,045 A | 5/1981 | Hoof | |
| 4,279,274 A | 7/1981 | Seger | |
| 4,327,757 A | 5/1982 | Weevers | |
| 4,352,373 A | 10/1982 | Kay et al. | |
| 4,356,843 A | 11/1982 | Baumann | |
| RE31,105 E | 12/1982 | Bates, Jr. | |
| 4,384,592 A | 5/1983 | Ng | |
| 4,398,563 A | 8/1983 | Kay et al. | |
| 4,407,327 A | 10/1983 | Hanson et al. | |
| 4,429,714 A | 2/1984 | Hughes et al. | |
| 4,456,033 A | 6/1984 | Kay et al. | |
| 4,473,210 A * | 9/1984 | Brighton | 251/127 |
| 4,479,510 A | 10/1984 | Bey | |
| 4,567,915 A * | 2/1986 | Bates et al. | 138/42 |
| RE32,197 E | 7/1986 | Self | |
| 4,617,963 A | 10/1986 | Stare | |
| 4,665,946 A | 5/1987 | Hulsey | |
| 4,671,321 A | 6/1987 | Paetzel et al. | |
| 4,921,014 A * | 5/1990 | Tartaglia et al. | 137/625.3 |
| 4,938,450 A | 7/1990 | Tripp et al. | |
| 5,014,746 A | 5/1991 | Heymann | |
| 5,020,571 A | 6/1991 | Tartaglia et al. | |
| 5,351,717 A | 10/1994 | Saito | |
| 5,390,896 A | 2/1995 | Smirl | |
| 5,687,763 A | 11/1997 | Steinke | |
| 5,769,122 A | 6/1998 | Baumann et al. | |
| 5,803,119 A | 9/1998 | Steinke | |
| 5,941,281 A | 8/1999 | Baumann et al. | |
| 6,026,196 A | 2/2000 | Shannon et al. | |
| 6,026,859 A | 2/2000 | Wears et al. | |
| 6,095,196 A | 8/2000 | McCarty et al. | |
| RE36,984 E | 12/2000 | Steinke | |
| 6,161,584 A | 12/2000 | Hemme et al. | |
| 6,382,253 B1 | 5/2002 | McCarty et al. | |
| 6,394,134 B1 | 5/2002 | Kwon | |
| 6,701,957 B2 * | 3/2004 | McCarty et al. | |
| 6,718,633 B1 * | 4/2004 | Glenn et al. | |
| 6,739,426 B2 * | 5/2004 | Sherikar et al. | 181/248 |
| 6,772,856 B2 * | 8/2004 | Ishii | |
| 7,013,918 B2 * | 3/2006 | McCarty et al. | |
| 7,320,340 B2 * | 1/2008 | Bush et al. | 138/42 |
| 2003/0221906 A1 * | 12/2003 | Sherikar et al. | 181/248 |
| 2004/0050433 A1 * | 3/2004 | Nawaz | |

FOREIGN PATENT DOCUMENTS

| | | | |
|---|---|---|---|
| DE | 2641761 | * | 9/1977 |
| DE | 2728697 | * | 1/1979 |
| DE | 8536664.1 | * | 7/1986 |
| GB | 2057637 | * | 4/1981 |
| JP | 60-164076 | * | 8/1985 |
| WO | 2005/103542 | * | 11/2005 |

OTHER PUBLICATIONS

"Cavitrol® III one-, Two-, and Three-Stage Trims", Cavitrol III Trims, Emerson Process Management, Product Bulletin, Sep. 2003, 12 pages.

"WhisperFlo® Vent Diffuser", Emerson Process Management, Product Bulletin, Aug. 2002, 4 pages.

"CAVIII Technical Highlights", Emerson Process Management, Admitted prior art, Published electronically on Jan. 9, 2002, 1 page.

"WhisperFlow™ Trim-New Technology That Quiets Control Valve Noise", Fisher Controls International, Inc., Dec. 1997, 10 pages.

"Valtek Megastream Control Valves", Rev. Apr. 1999, Flowserve Corporation, 1999,12 pages.

"Valtek CavControl Trim", Rev. Apr. 1999, Flowserve Corporation, 1998, 4 pages.

"Tiger-Tooth Control Valves", Rev. Dec. 1993, Flowserve Corporation, 1996, 12 pages.

"Atmospheric Resistors", Control Components Inc., Feb. 1998, 8 pages.

"DRAG® Technology for Boiler Feedpump Recirculation Applications", Control Components Inc., Mar. 2003, 8 pages.

"CCI DRAG® Compressor Recycle Anti-Surge Valve", Control Components Inc., Jan. 2003, 8 pages.

"CCI Choke Valve", Control Components Inc., May 2002, 8 pages.

"DRAG® 800D Control Valves for Severe Service Applications", Control Components Inc., Aug. 2002, 8 pages.

"Sulzer Valves-Low Pressure Turbine Bypass Valve NBSE™", Control Components Inc., Mar. 2002, 8 pages.

"DRAG® The Valve Doctor®Solution", Control Components Inc., Retrieved from the Internet on Jun. 25, 2004: <URL http://www.ccivalve.com/pdf/451.pdf>, 20 pages.

"Coefficients and Factors Relating to the Aerodynamic Sound Level Generated by Throttling Valves", H.D. Baumann, Noise Control Engineering Journal, Jan. Feb. 1984, pp. 6-11.

Patent Cooperation Treaty, "Written Opinion of the International Searching Authority," issued by the International Searching Authority in connection with related PCT application No. PCT/US2007/007646, mailed Sep. 13, 2007 (6 pages).

Patent Cooperation Treaty, "International Search Report," issued by the International Searching Authority in connection with related PCT application No. PCT/US2007/007646, mailed Sep. 13, 2007 (5 pages).

Emerson Process Management, "Technology Summary—Whisper Trim I,"2004, (2 pages).

Emerson Process Management, "Technology Summary—Whisper Trim III," 2004, (2 pages).

Emerson Process Management, "Technology Summary—WhisperFlo® Trim," 2004 (2 pages).

Emerson Process Management, "Technology Summary—Design V260 Control Valve," 2004 (2 pages).

Emerson Process Management, "Type 6010, 6011, and Whisper Disk Inline Diffusers," Product Bulletin, Feb. 2005 (8 pages).

Masoneilan Dresser, "77000 Series High pressure Control Valve Instructions," Instruction No. EP5500E, Nov. 1986 (8 pages).

Flowserve, "Valtek MegaStream Control Valves," Installation, Operation, Maintenance Instructions 1999, (4 pages).

Samson, "Series 3240, Globe Control Valve Type 3241 (241), Pneumatic Control Valves Type 3241/3271 (241-1) and Type 3241/3277 (241-7)," Technical Data Sheet, Jul. 1998 (16 pages).

* cited by examiner

US 8,033,300 B2

FLUID PRESSURE REDUCTION DEVICES

RELATED APPLICATIONS

This patent is a continuation of U.S. patent application Ser. No. 11/405,777, filed on Apr. 18, 2006, which is hereby incorporated by reference herein in its entirety.

FIELD OF THE DISCLOSURE

The present disclosure relates generally to fluid pressure reduction devices and, more particularly, to fluid pressure reduction devices for use in process fluid handling systems.

BACKGROUND

In the process control industry, many control valve applications, such as power generation or petroleum refining applications, result in process conditions that produce unacceptable levels of aerodynamic noise. For example, a generally acceptable level of aerodynamic noise is approximately 85 dBA measured 1 meter downstream and 1 meter off the pipeline containing the control valve. It is understood that Fluid Pressure Reduction Devices implemented as valve trim or as vent diffusers can substantially reduce the noise generated within various process applications. The physics and fluid dynamics of these fluid pressure reduction devices and the prediction of aerodynamic noise in applications of fluid pressure reduction devices have been fairly well understood in recent years.

Conventional solutions to control valve noise problems include fluid pressure reduction devices of a cylindrical shape that implement special internal fluid structures to stage the pressure drop (i.e. control the pressure drop in discrete transitions within the fluid pressure reduction device) and/or the segregate of the fluid pressure reduction device outlet flow into multiple, smaller flow streams to reduce aerodynamic noise. Further, it is understood that conventional fluid pressure reduction devices use two general passageway cross sections: circular and rectangular. These passageway cross sections were typically limited by prior manufacturing capabilities. Due to these historical manufacturing and prediction technologies, these passageway cross sections continue in present implementations. Specifically, fluid pressure reduction devices constructed from stacked discs or investment cast plates generally produce rectangular cross section flow passage shape while cylindrically formed components with subsequent traditional machining operations yield circular cross section flow passage shapes.

The purpose of these flow passages is to create noise reduction structures within the fluid pressure reduction devices to reduce the amount of energy in the flow stream that is converted to noise and/or shift the frequency of the generated noise to levels beyond the audible range. One such common strategy to reduce aerodynamic noise is to minimize the size of apertures or reduce the cross-sectional area of the passageways in the fluid pressure reduction devices to induce a peak frequency shift of the generated noise beyond the audible range. Thus, to improve the performance of a fluid pressure reduction device, manufacturers make the flow passages as small as practical. However, this noise reduction technique is disadvantageous because it can reduce the overall flow capacity of the control valve and makes the fluid pressure reduction device susceptible to plugging or flow impediment.

SUMMARY

Example fluid pressure reduction devices disclosed herein may be used to reduce the energy, pressure, and/or noise associated with process fluids. In accordance with one example, a fluid pressure reduction device may include a hollow cylinder having an inner surface and an outer surface and a plurality of passageways extending between the inner and outer surfaces. Each of the passageways delimits an aperture having a cross-sectional area defining a wetted perimeter that is greater than a wetted perimeter of one of a circle or a rectangle having the same cross-sectional area as the aperture.

In accordance with another example, a fluid pressure reduction device may include a hollow cylinder having an inner surface and an outer surface and a plurality of passageways extending between the inner and outer surfaces defining a hydraulic diameter of the passageway that substantially reduces aerodynamic noise developed by fluid flow within the passageway.

In accordance with yet another example, a fluid pressure reduction device may include a cylinder having an inner diameter surface and an outer diameter surface and a plurality of apertures extending between the inner and outer diameter surfaces. Each of the apertures has an opening having at least one curvilinear side or edge.

In accordance with yet another example, a fluid pressure reduction device may include a cylinder having an inner diameter surface and an outer diameter surface and a plurality of apertures extending between the inner and outer diameter surfaces. Each of the apertures has an opening on the outer diameter surface that includes at least first and second area portions defined by a plane intersecting a centroid of the opening and having different areas.

DETAILED DESCRIPTION

Example fluid pressure reduction devices disclosed herein may be used to reduce the noise and/or pressure generated in a process fluid such as, for example, a gas or liquid in a process fluid handling system. Unlike known fluid pressure reduction devices having circular or rectangular apertures, the example fluid pressure reduction devices described herein are implemented using apertures having relatively larger wetted perimeters than known apertures. Additionally, the example apertures used to implement the example fluid pressure reduction devices described herein provide a relatively larger wetted perimeter while at the same time providing fluid passages with apertures having cross-sectional areas substantially the same or equal to those used to form apertures in known fluid pressure reduction devices. In other words, the example fluid pressure reduction devices described herein utilize apertures having relatively larger wetted perimeter-to-area ratios than provided by known fluid pressure reduction devices utilizing substantially circular or rectangular apertures.

As described in greater detail below, increasing the wetted perimeter-to-area ratio of an aperture substantially improves the noise reduction properties of the aperture. In known fluid pressure reduction devices, the wetted perimeters of circular or rectangular-shaped apertures formed therein are inherently limited by a requirement to reduce fluid noise yet maintain adequate flow capacity. Thus, to increase the wetted perimeters of known circular or rectangular-shaped apertures, the overall size or dimensions of the aperture must be increased. However, increasing the overall aperture size decreases the wetted perimeter-to-area ratio and affects, among other properties, the noise attenuation properties of the aperture.

In some example implementations, the fluid pressure reduction devices described below may be implemented using apertures that form asymmetric openings and/or which have concave or curvilinear sides or perimeter edges. In particular, the example apertures described below have relatively larger wetted perimeter-to-area ratios than the apertures used with known fluid noise reduction devices. Some of the example apertures described below can be arranged in alternating inverted or rotated pattern configurations to increase aperture density (e.g., the number of apertures formed in a given area of a fluid pressure reduction device), thereby increasing the overall wetted perimeter-to-area ratio of the fluid pressure reduction device. Increasing the wetted perimeter-to-area ratio of each aperture (and the overall fluid pressure reduction device) and/or forming more apertures in a given fluid pressure reduction device enables the fluid pressure reduction device to maintain or increase flow capacity while more effectively attenuating noise for a corresponding pressure reduction.

Figure 1:
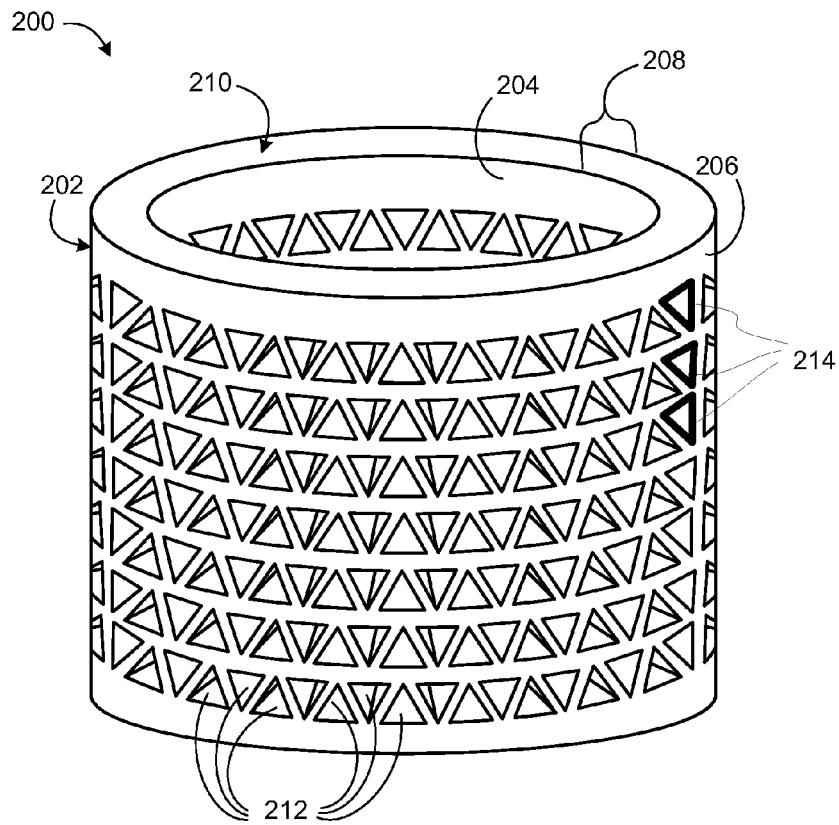
FIG. 1 is an isometric view of an example fluid pressure reduction device.

Turning in detail to the illustrated example of FIG. 1, the example fluid pressure reduction device 200 is implemented using a hollow cylinder 202 having a cylinder wall 208 having an inner surface 204 (e.g., an inner diameter surface) and an outer surface 206 (e.g., an outer diameter surface). The cylinder 202 also includes a first end surface or top surface 210 and a second end surface or bottom surface (not shown) opposite the top surface 210. Additionally, the cylinder 202 includes a plurality of triangle-shaped passageways 212 that extend through the cylinder wall 208. Specifically, the triangular passageways 212 have triangular apertures 214 or, more generally, openings having rectilinear peripheral edges or sides that define a generally triangular opening. In an example implementation involving a fluid flow direction from the inner surface 204 toward the outer surface 206, the triangular apertures 214 formed on the inner surface 204 are inlet apertures and the triangular apertures 214 formed on the outer surface 206 are outlet apertures.

Although in the illustrated example, the fluid pressure reduction device 200 is implemented using one cylinder (i.e., the cylinder 202) in alternative example implementations described in greater detail below, the fluid pressure reduction device 200 may be implemented using two or more concentric, coaxial, or nested cylinders (e.g., the example fluid pressure reduction device 1400 of FIG. 14), at least one of which includes the triangular passageways 212 and/or other example passageways described herein. In other alternative example implementations, the fluid pressure reduction device 200 may be implemented using a plurality of stacked rings (e.g., the example fluid pressure reduction device 1500 of FIGS. 15A and 15B), at least some of which are used to form the triangular passageways 212 and/or other example passageways described herein.

In alternative example implementations, fluid pressure reduction devices implemented as described herein may be formed using substantially hollow structures or tubular structures of non-circular cross-sectional shapes. That is, example fluid pressure reduction devices described herein may be implemented using hollow structures of elliptical cross-sectional shapes or any other cross-sectional shapes. However, for purposes of clarity the example fluid pressure reduction devices are described herein using hollow cylinders of substantially circular cross-sectional shapes.

Although the triangular apertures 214 formed by the triangular passageways 212 are shown extending through to the inner surface 204 and the outer surface 206, in other example implementations, surface shapes may be formed on surfaces within the cylinder wall 208 and, thus, may not be visible from the exterior (e.g., at the surfaces 204 and 206) of the cylinder 202. For example, the inlet and outlet apertures formed on the inner and outer surfaces 204, 206 may be shaped differently than a corresponding passageway (e.g., the triangular passageway 212) extending therebetween through the cylinder wall 208. In a nested cylinder configuration (e.g., the example fluid pressure reduction device 1400 of FIG. 14), the cylinder 202 may be nested between inner and outer cylinders (e.g., cylinders 1402 and 1406 of FIG. 14) having inlet/outlet apertures shaped different from the triangular apertures 214 of the cylinders 202. Additionally or alternatively, the fluid pressure reduction device 200 may be implemented using apertures that form openings having shapes other than triangles including, for example, the shapes described below or any other shapes, some of which may have one or more vertices (e.g., three vertices for a triangle, one vertex for a teardrop shape, etc.).

Figure 2:
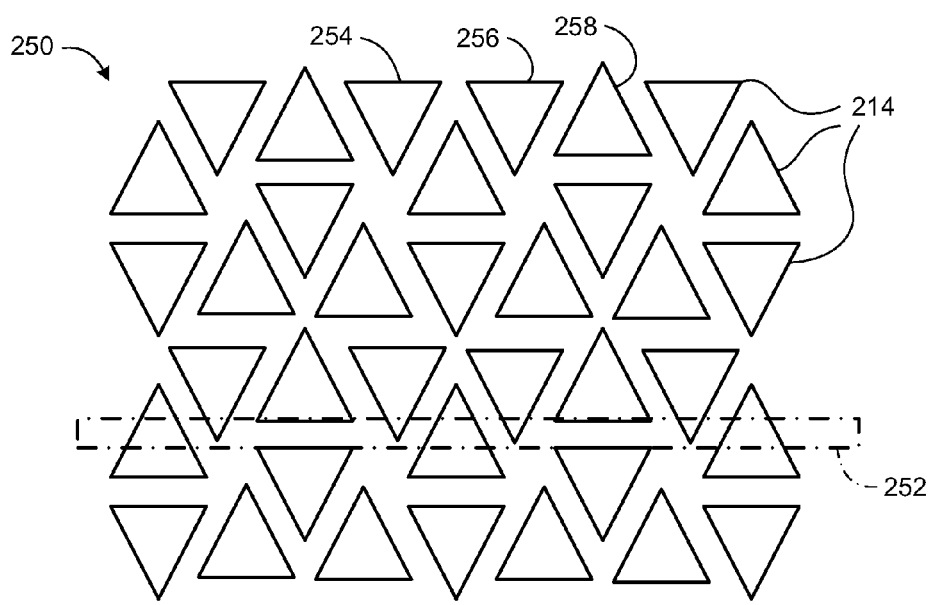
FIG. 2 depicts an example inverted pattern that may be used to arrange apertures in the example fluid pressure reduction device of FIG. 1.

In the inverted pattern used to arrange the triangle apertures 214 as shown in FIG. 1, a base of each inverted aperture is aligned with a vertex of an adjacent non-inverted aperture in the same row. However, in an alternative implementation, the example fluid pressure reduction device 200 is implemented by arranging the triangle apertures 214 using another example inverted pattern 250 illustrated in FIG. 2. As shown in FIG. 2, some of the triangle apertures 214 are inverted and offset relative to others of the triangle apertures 214. In this manner, bases of inverted apertures are not horizontally aligned with vertexes of adjacent non-inverted apertures within the same row. Inverting and offsetting apertures (e.g., as shown in the inverted pattern 250) enables forming relatively more of the triangle apertures 214 within a given area and enhances fluid flow through fluid pressure reduction devices.

Figure 7:
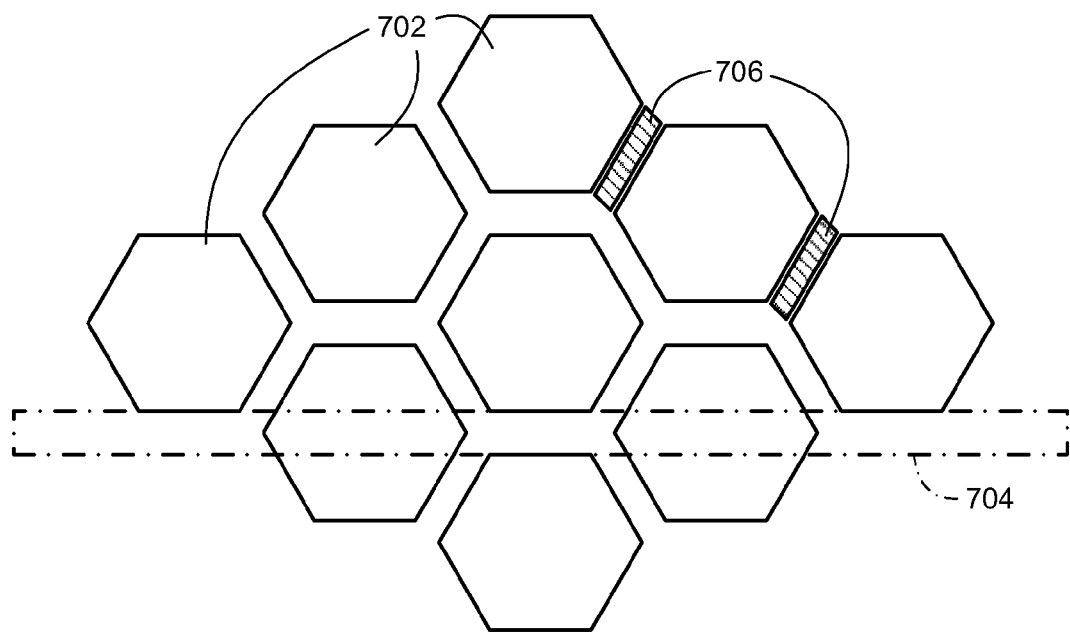
FIG. 7 depicts a plurality of example hexagonal apertures that may be used to implement a fluid pressure reduction.
Figure 16:
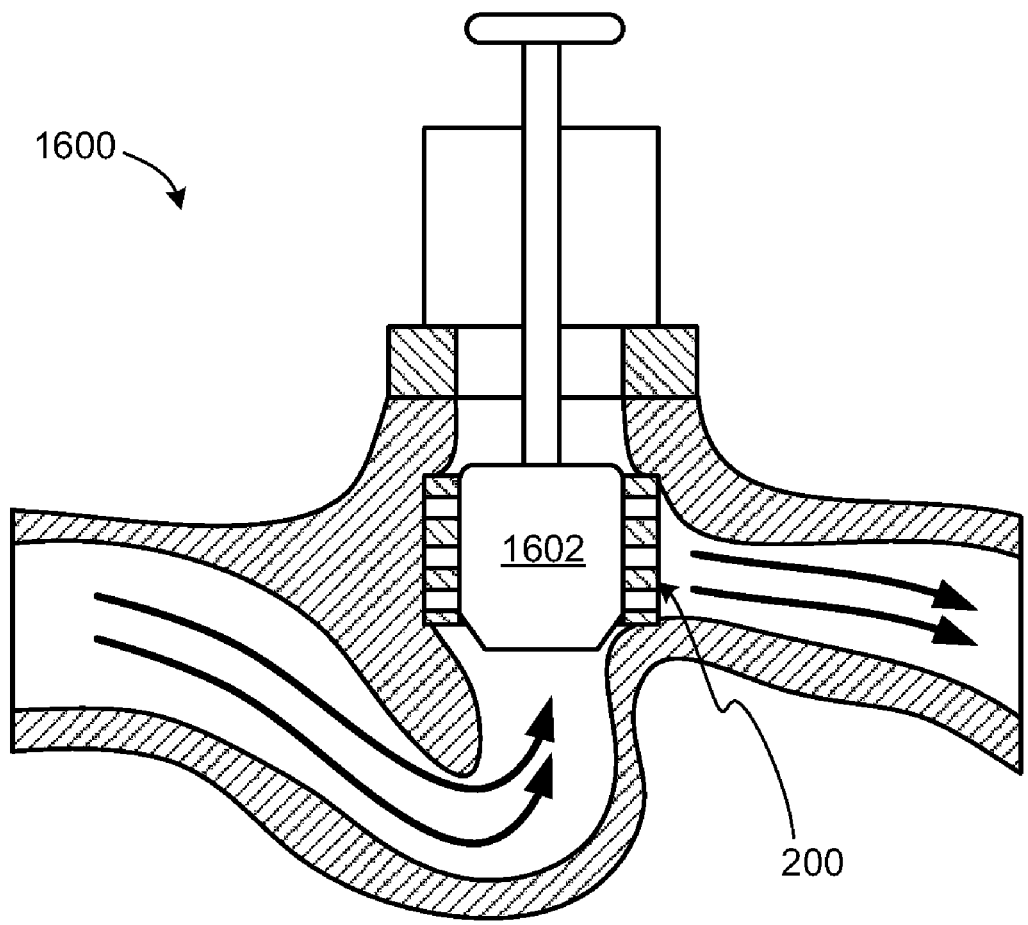
FIG. 16 depicts an example valve assembly that may be used in connection with the example fluid pressure reduction devices described herein.

Inverting and offsetting apertures substantially reduces or eliminates continuous portions of material between aperture rows and enables a continuous increase in flow through a fluid pressure reduction device as a plug of a valve assembly (e.g., a plug 1602 of a valve assembly 1600 shown in FIG. 16) opens vertically exposing the apertures 214 to enable fluid flow therethrough. For example, as shown in FIG. 2, offsetting the triangle apertures 214 relative to one another in both horizontal and vertical directions eliminates a circumferentially continuous portion of material 252 indicated by a phantom line. Patterns having offset apertures in both vertical and horizontal directions may be used for any type of aperture to substantially reduce or eliminate circumferentially continuous portions of material between aperture rows. For example, as shown in FIG. 7, offsetting hexagonal apertures 702 relative to one another in both horizontal and vertical directions eliminates a circumferentially continuous portion of material 704 indicated by a phantom line.

In the illustrated example of FIG. 2, the inverted pattern 250 is not a direct inverse pattern. That is, some adjacent rows are not identically configured or are not direct inverses of one another. In addition, a particular row may include adjacent apertures that are not substantially inverted relative to one another. For example, as shown in FIG. 2, adjacent apertures 254 and 256 are not inverted relative to one another. However, the aperture 256 is inverted relative to an aperture 258, which is in the same row as the apertures 254 and 256.

The fluid pressure reduction device 200 may be implemented using apertures that form differently shaped openings that are intermingled, some of which may be selected according to the examples described herein. For example, in alternative example implementations, the fluid pressure reduction device 200 may be implemented using a combination of apertures that form the triangular apertures 214 and apertures having hexagonal openings (e.g., the hexagonal apertures 702 of FIG. 7).

In the illustrated example implementations, the triangular passageways 212 form flow paths between the inner surface 204 and the outer surface 206 to enable process fluids to flow in a controlled manner via the flow paths between the inner surface 204 and the outer surface 206 of the cylinder wall 208. In some example implementations, each of the triangular passageways 212 may form a single flow path. In those example implementations, all of the process fluid entering through one end (e.g., through the inner surface 204 end) of one of the triangular passageway 212 will exit out of the other end (e.g., the outer surface 206 end) of the same triangular passageway 212.

The triangular passageways 212 are formed in the cylinder 202 in a pattern or configuration that substantially increases the wetted perimeter associated with the fluid pressure reduction device 200 compared to known fluid pressure reduction devices. In particular, as shown in FIG. 1, the triangular passageways 212 are formed in an alternating inverted pattern configuration such that a first one of the triangular passageways 212 formed in a right-side up configuration (e.g., so that the apex of the triangular opening is directed toward the top surface 210) is adjacent to a second one of the triangular passageways 212 formed in an upside down configuration (e.g., so that the apex of the triangular opening is directed toward the bottom surface of the cylinder 202).

Alternately inverting each of the triangular passageways 212 as shown in FIG. 1 enables reducing the space, distance, or material between each of the triangle passageways 212 so that the passageways 212 are closer together. In this manner, relatively more of the triangle passageways 212 can be formed in the cylinder 202 to increase the total wetted perimeter and wetted perimeter-to-area ratio (e.g., relative to the surface area of the cylinder 202) associated with the fluid pressure reduction device 200, and thus, not only improving the attenuation characteristics of the fluid pressure reduction device 200 but also improving the flow capacity by increasing the total number of flow passageways per unit surface area of the fluid pressure reduction device 200.

The example fluid pressure reduction device 200 may be made of any type of material or combination of materials, including metallic and/or non-metallic materials. Additionally, one or more manufacturing processes may be used to manufacture the example fluid pressure reduction device 200 to have any desired diameter and length. The manufacturing processes may include, for example, investment casting, precision casting, laser cutting, water jet cutting, electrical discharge machining (EDM), powder metallurgy (PM), metal injection molding (MIM), acid etching, a drawn tubing process, and/or any other suitable manufacturing or fabrication process. The above-mentioned manufacturing processes are well known to one of ordinary skill in the art.

The above-mentioned manufacturing processes provide several methods to manufacture cylinders. An example method involves laser cutting the passageways within a rectangular piece of flat stock, bending the flat stock, and welding the ends of the rectangular flat stock to form a cylinder. As previously mentioned, multiple cylinders could be concentrically or coaxially assembled to increase the passageway length and improve the attenuation characteristics by incorporating more pressure drop stages. Another example method involves investment casting, which involves pouring a molten metal into a ceramic mold. Investment casting enables the simultaneous production of multiple cylinders in a high-volume mass-production process without requiring substantial amounts of production equipment, thereby keeping manufacturing overhead costs relatively low. Some of the above-mentioned manufacturing processes such as, for example, PM and MIM enable the use of materials that are not readily available in flat stock to make the example fluid pressure reduction device 200. In particular, non-metallic materials such as, for example, ceramics may be used with some or all of the above-mentioned manufacturing processes or similar processes to form the example fluid pressure reduction device 200.

Figure 3:
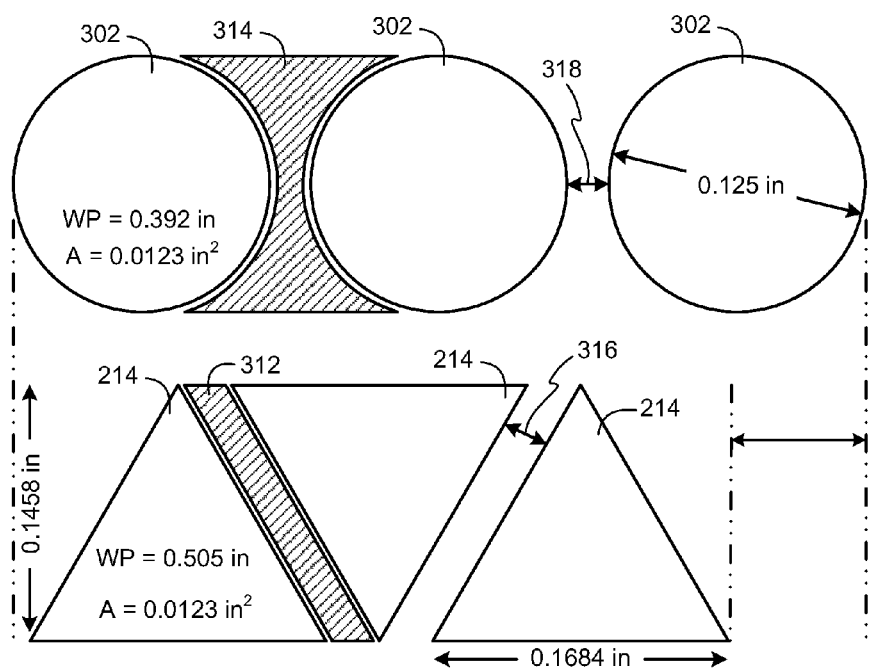
FIGS. 3 through 5 depict comparisons between apertures used in known fluid pressure reduction devices and example triangular apertures used in the example fluid pressure reduction device of FIG. 1.
Figure 4:
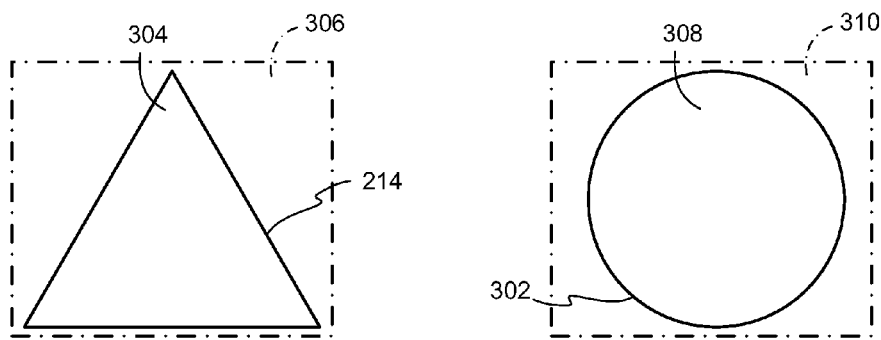
Figure 5:
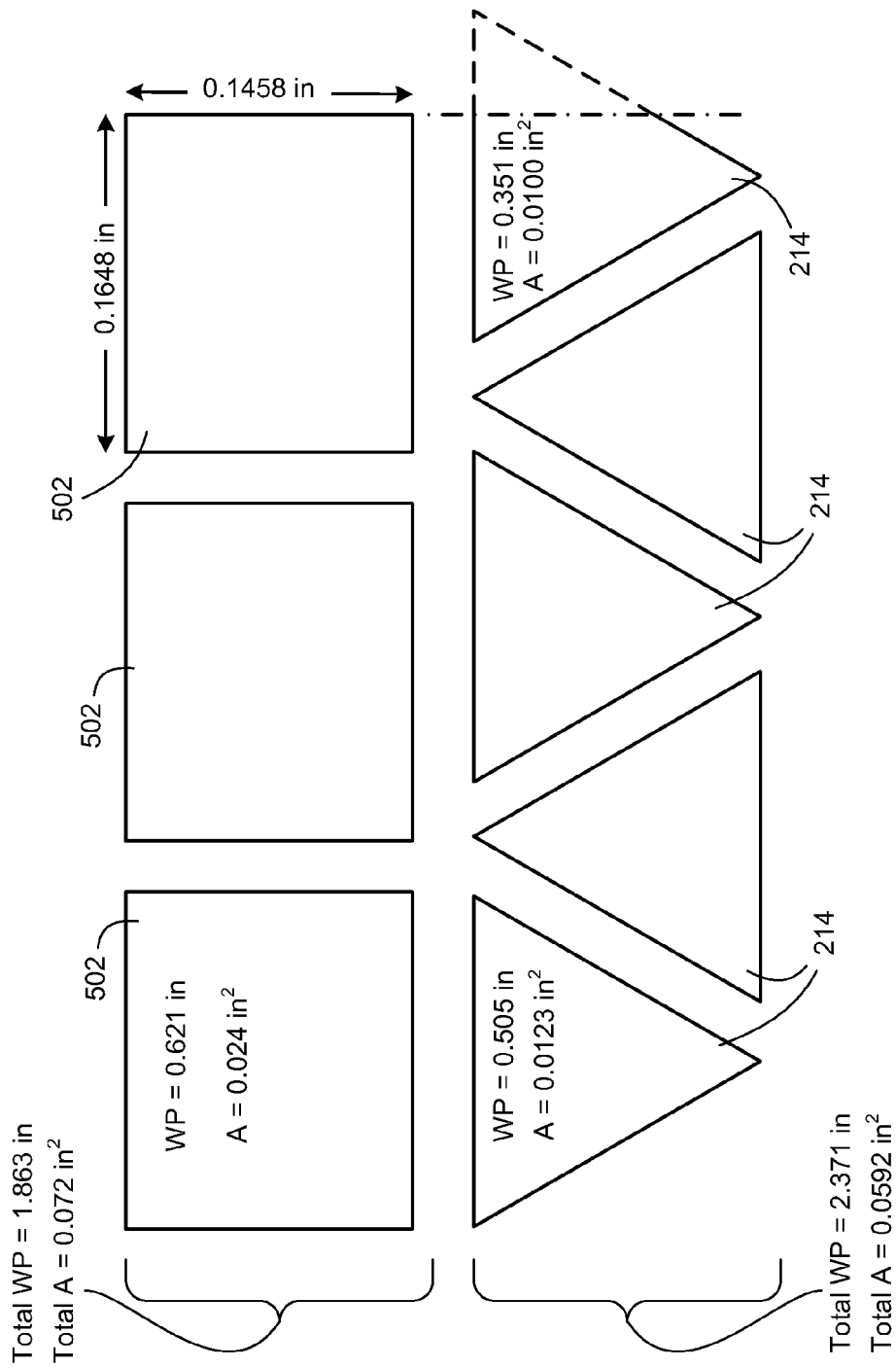

FIGS. 3 through 5 depict comparisons between apertures used in known fluid pressure reduction devices and the example triangular apertures 214 of FIG. 1 used in example fluid pressure reduction device 200 of FIG. 1. In particular, FIG. 3 depicts a circular aperture 302 in a typical arrangement or placement configuration used in connection with known fluid pressure reduction devices, and in the alternative, the triangular apertures 214 in the alternating inverted pattern configuration used to decrease the spacing between each of the triangular passageways 212 in the example fluid pressure reduction device 200.

As shown in FIG. 4 one of the triangular apertures 214 (associated with one of the triangular passageways 212) occupies a total surface area, which comprises an opening 304 and a surrounding surface area 306, that is substantially similar or equal to a total surface area of one of the circular apertures 302, which comprises an opening 308 and a surrounding surface area 310. However, by implementing an alternating inverted pattern configuration as shown in FIGS. 1-3, the thickness or size (and surface area) of an inter-aperture wall 312 (FIG. 3) between two adjacent triangular apertures 214 can be substantially reduced. Also, although the opening area 304 associated one of the triangular apertures 214 is equal to the opening area 308 of one of the circular apertures 302 (e.g., area=0.0123 inches$^2$) as indicated in FIG. 3, multiple alternating inverted triangular apertures 214 (e.g., three are shown in the example of FIG. 3) require less total surface area of the cylinder 202 than multiple circular apertures 302 while maintaining a minimum inter-aperture wall thickness 316 substantially the same or equal to a minimum inter-aperture wall thickness 318 associated with the circular apertures 302. In some example implementations, the minimum inter-aperture wall thicknesses 316 and 318 may be associated with a minimum thickness needed to maintain structural integrity of a fluid pressure reduction device during operation. The alternating inverted pattern configuration shown in FIGS. 1-3 can be advantageously implemented using the triangular passageways 212 to use more of the surrounding surface area 306 to increase a total wetted perimeter of the fluid pressure reduction device 200 (FIG. 1) by forming substantially more of the triangular passageways 212 in a given portion of the cylinder wall 208 (e.g., to have a greater aperture density) thereby increasing the flow capacity of the fluid pressure reduction device 200 relative to a conventional fluid pressure reduction device.

In addition to facilitating an alternating inverted pattern configuration to form relatively more apertures in a fluid pressure reduction device 200, the triangular aperture 214 has a relatively larger wetted perimeter-to-area ratio than the circular aperture 302. As shown in FIG. 3, the triangular aperture 214 has a wetted perimeter equal to 0.505 inches and an area equal to 0.0123 inches$^2$ and, thus, has a wetted perimeter-to-area ratio of 41. In contrast, the circular aperture 302 has a wetted perimeter-to-area ratio of 31.8, which is substantially less than the wetted perimeter-to-area ratio of the triangular aperture 214.

The increased wetted perimeter-to-area ratio of the triangular aperture 214 also has a relatively lower hydraulic diameter ($d_H$) and a relatively lower control valve style modifier factor ($F_D$) than the hydraulic diameter ($d_H$) and the control valve style modifier factor ($F_D$) of the circular aperture 302. The hydraulic diameter ($d_H$) is a dimension used to represent the size of an opening (e.g., a fluid outlet opening or a fluid inlet opening) on a cylinder surface (e.g., the inner surface 204 or the outer surface 206 of the cylinder 202) formed by a passageway (e.g., the triangular passageway 212). The hydraulic diameter ($d_H$) is particularly useful for representing the size of non-circular openings and may be determined using Equation 1, below.

$$\text{i. } d_H = \frac{4 \times A}{l_W} \quad \text{Equation 1}$$

As shown above in Equation 1, the hydraulic diameter ($d_H$) is defined by the ratio of the product of four (4) times the Area of the passageway aperture and the wetted perimeter. For example, the area 304 of FIG. 4 aperture in multiplied by 4 and divided by the wetted perimeter ($l_w$) (i.e., $$\frac{4 \times A}{l_W})$$

of the opening.

Additionally, the control valve style modifier factor ($F_D$) is a metric that is indirectly proportional to the noise attenuation properties of an aperture and, thus, is indicative of the relative amount of noise that an aperture can attenuate. Specifically, the lower the control valve style modifier factor ($F_D$) of an aperture the greater the amount of noise that is attenuated by the aperture. The control valve style modifier factor ($F_D$) of a particular aperture may be determined using Equations 2 and 3 below.

$$\text{ii. } F_D = \frac{d_H}{d_O} \quad \text{Equation 2}$$

$$\text{iii. } d_O = \sqrt{\frac{4 \times N_O \times A}{\pi}} \quad \text{Equation 3}$$

As shown above in Equation 2, the control valve style modifier factor ($F_D$) of an aperture may be determined by dividing the hydraulic diameter ($d_H$) of an opening (e.g., one of the triangular apertures 214 of FIG. 1) by an equivalent circular diameter ($d_O$) of the opening. As is well known in the art, the equivalent circular diameter ($d_O$) of an opening represents the diameter of an equivalent circular opening (i.e., a circular opening having the same area). As shown in Equation 2, the equivalent circular diameter ($d_O$) may be determined by the product of four times a number of apertures ($N_O$) to produce a first product (4×No), multiplying the first product (4×No) by the surface shape area (A) of the opening to produce a second product (4×No×A), dividing the second product (4×No×A) by Pi ($\pi$) to produce a quotient $$\left(\frac{4 \times N_O \times A}{\pi}\right),$$

and performing a square root operation on the quotient (e.g., $$\sqrt{\frac{4 \times N_O \times A}{\pi}} 0,$$

The control valve style modifier factor ($F_D$) may be used to design openings that result in relatively more fluid noise reduction than is achievable using known apertures. Specifically, the magnitude of the control valve style modifier factor ($F_D$) is directly proportional to the hydraulic diameter ($d_H$). The highest frequency that can be effectively attenuated by an aperture is inversely proportional to the hydraulic diameter ($d_H$) of the aperture and, thus, the control valve style modifier factor ($F_D$) of that aperture. Apertures having a relatively lower cutoff frequency attenuate relatively more noise.

An aperture effectively attenuates noise associated with frequencies above a lower cutoff frequency of an aperture. Apertures having relatively small hydraulic diameters ($d_H$) have relatively lower cutoff frequencies than apertures of relatively larger hydraulic diameters ($d_H$) and, thus, provide greater attenuation of aerodynamic noise generated by the fluid flow. Further, designing apertures having relatively smaller hydraulic diameters ($d_H$) also enables forming more of those apertures in a fluid pressure reduction device, which increases the fluid flow capacity of the fluid pressure reduction device.

Although the opening areas of the triangular aperture 214 and the circular aperture 302 are equal (e.g., area=0.0123 inches$^2$) (e.g., the triangular aperture 214 has an equivalent circular diameter ($d_O$) ($d_O$=0.125 inches) that is equal to the circular diameter (d=0.125 inches) of the circular aperture 302), the triangular aperture 214 is associated with a relatively lower control valve style modifier factor ($F_D$) and a relatively larger wetted perimeter (WP).

FIG. 5 depicts rectangle-shaped (i.e., rectangular) apertures 502 in a typical arrangement or placement configuration used in connection with known fluid pressure reduction devices and some of the triangular apertures 214 in the alternating inverted pattern configuration. In particular, FIG. 5 illustrates a comparison between the total wetted perimeter and total area of the rectangular apertures 502 and the total wetted perimeter and total area of the triangular passageways 212 when a plurality of each of the aperture types are formed within respective similarly sized areas. In the illustrated example, the rectangular apertures 502 have the same base and height dimensions as the triangular apertures 214.

Although the wetted perimeter (0.621 inches) of the rectangular aperture 502 is larger than the wetted perimeter (0.505 inches) of the triangular aperture 214, arranging the triangular apertures 214 in the alternating inverted pattern configuration shown in FIGS. 3 and 5 produces a larger total wetted perimeter (2.371 inches) than the total wetted perimeter (1.863 inches) of the three rectangular apertures 502, which are spaced apart by the same distance and formed within a similarly sized area as the triangular apertures 214. Further, because the triangular apertures 214 has a smaller hydraulic diameter ($d_H$) and a larger wetted perimeter-to-area ratio than the rectangular aperture 502, the triangular apertures 214 attenuate more fluid noise than the rectangular apertures 502.

Figure 6:
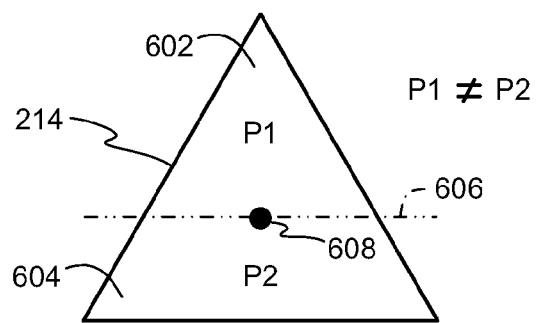
FIG. 6 depicts a non-symmetrical property of the example triangular aperture of FIGS. 3 through 5.

FIG. 6 depicts a non-symmetrical property of an opening (e.g., one of the triangular apertures 214 of FIG. 1) formed by one of the triangular passageways 212 of FIG. 1. Specifically, the triangular aperture 214 is shown as having a first area portion P1 602 and a second area portion P2 604, where each of the area portions P1 602 and P2 604 have different areas. As shown, the area portions P1 602 and P2 604 are defined by a plane 606 that intersects a centroid 608 of the triangular aperture 214. Some of the opening shapes described herein and other opening shapes not described, but fairly falling within the spirit and scope of the examples described herein, may include at least two area portions (e.g., the area portions P1 602 and P2 604) having unequal areas and defined by a plane (e.g., the plane 606) that intersects a centroid (e.g., the centroid 608) of the opening.

FIG. 7 depicts a plurality of example hexagonal apertures 702 that may be used to form a fluid pressure reduction device (e.g., the fluid pressure reduction device 200 of FIG. 1). In particular, as shown in FIG. 7, the example hexagonal apertures 702 may be arranged in a honeycomb-like pattern that reduces the thickness or width of inter-aperture walls 706, thus increasing the number of apertures that can be formed in a given portion of a fluid pressure reduction device. Further, a hexagonal opening has a relatively greater wetted perimeter-to-area ratio and a relatively lower control valve style modifier factor ($F_D$) than rectangular or circular openings having areas substantially similar or identical to the area of a hexagonal opening. The relatively greater wetted perimeter-to-area ratio and the relatively lower control valve style modifier factor ($F_D$) enable the hexagonal apertures 702 to attenuate noises produced over relatively broader frequency spectrums than circular or rectangular apertures (e.g., the circular apertures 302 of FIG. 3 and the rectangular apertures 502 of FIG. 5).

Figure 8:
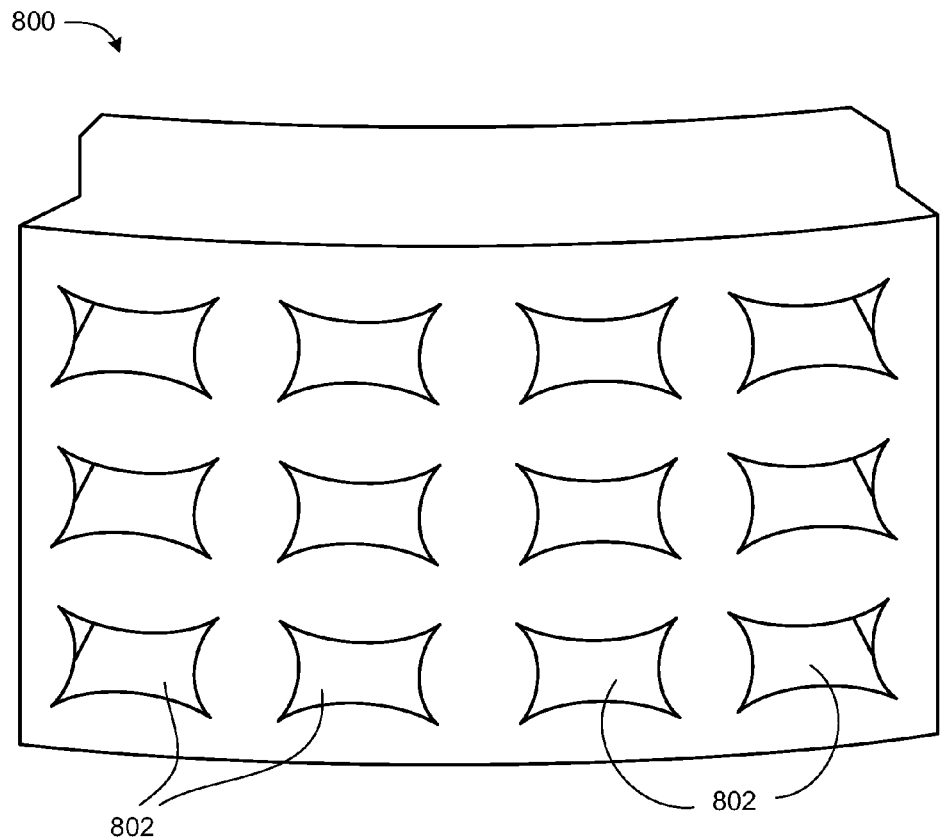
FIG. 8 depicts an isometric view of a portion of an example fluid pressure reduction device including a plurality of apertures each of which has a plurality of concave-shaped or curvilinear sides or edges.
Figure 9:
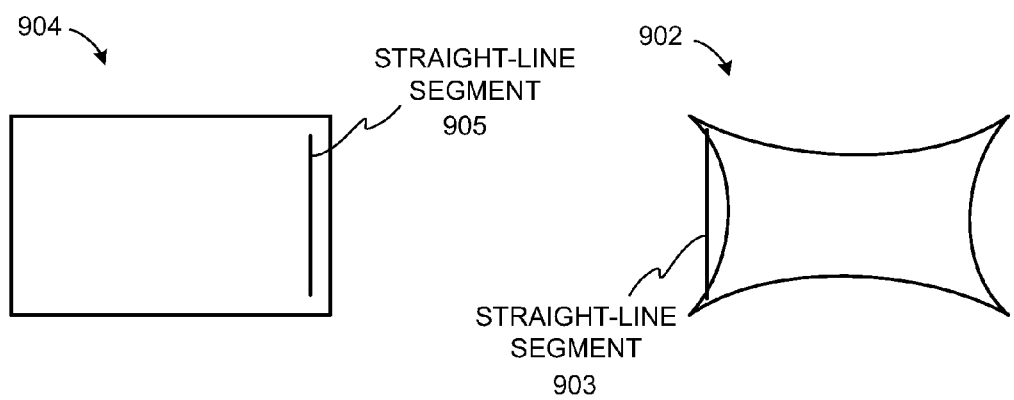
FIGS. 9 and 10 depict a comparison between the wetted perimeters of one of the apertures of FIG. 8 and a similarly sized rectangular aperture.
Figure 10:
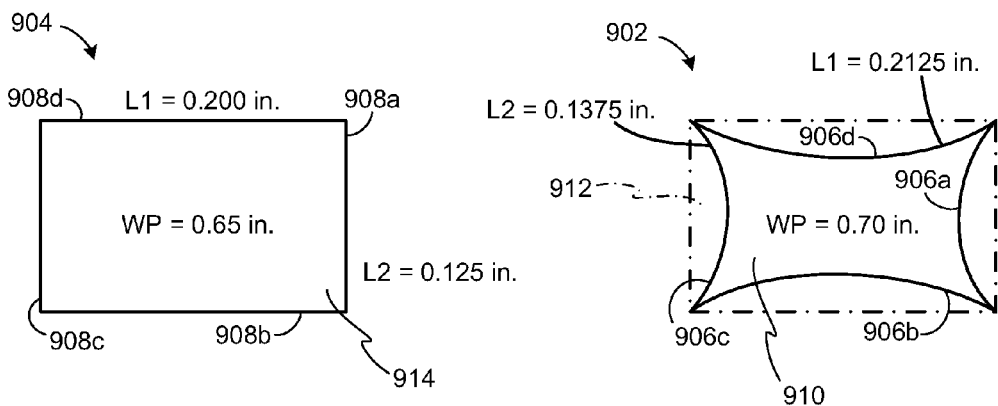
Figure 11:
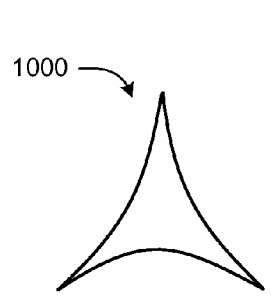
FIGS. 11 and 12 depict other example apertures having curvilinear edges that may be used in the example fluid pressure reduction devices described herein.
Figure 12:
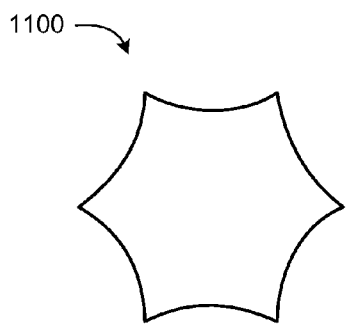

FIG. 8 depicts an isometric view of a portion of an example fluid pressure reduction device 800 having a plurality of apertures 802, each of which has a generally concave shape 902 shown in FIGS. 9 and 10. The concave shape 902 is a rectangular opening having concave, curvilinear perimeter portions or side edges. However, differently shaped openings having concave or curvilinear perimeter portions or edges may be used instead of or in addition to the opening 902 including, for example, generally triangular openings, generally hexagonal openings, generally star-shaped openings, generally crescent-shaped openings, other generally polygonal openings, etc. For example, a generally concave triangular opening 1000 as shown in FIG. 11 and/or a generally hexagonal opening 1100 as shown in FIG. 12 could be used.

In general, as used herein, a concave opening has at least one curvilinear side or edge. Curving a side or edge of an opening increases the length of that side or edge and, thus, contributes to increasing the overall wetted perimeter of the opening.

FIGS. 9 and 10 depict comparisons between the concave shaped opening 902 and a convex shaped opening 904, which has rectilinear sides or edges. As shown in FIG. 9, the concave shape 902 defines a region for which at least a straight-line segment 903 between two points of the region is not entirely contained within the region. In contrast, the convex shape 904 defines a region for which a straight-line segment 905 between any two points of the region is entirely contained within the region.

As shown in FIG. 10, the opening 902 has four curvilinear sides or edges 906a, 906b, 906c, and 906d, each of which has a greater length than a respective one of a plurality of rectilinear sides 908a, 908b, 908c, and 908d of the opening 904. The curvilinear or curved sides 906a-d result in a larger wetted perimeter, a larger wetted perimeter-to-area ratio, and a smaller control valve style modifier factor ($F_D$) in comparison to the opening 904.

Although the opening 902 occupies a total surface area, which includes an opening area 910 and a surrounding surface area 912 that is substantially similar or equal to an area 914 occupied by the substantially rectangular opening 904, the curvilinear sides 906a-d provide the opening 902 with a relatively greater wetted perimeter without increasing the required total surface area (e.g., the sum of the area 910 and the area 912).

Figure 13:
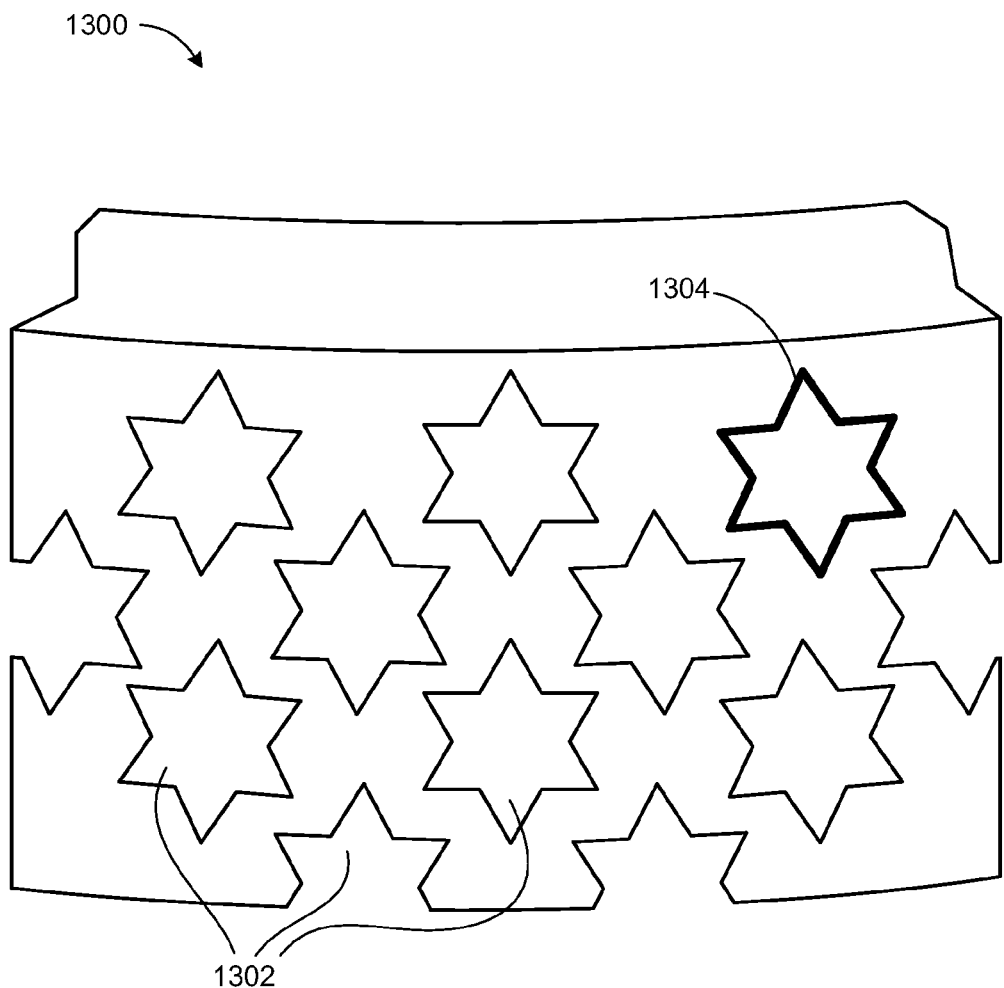
FIG. 13 depicts an isometric view of a portion of an example fluid pressure reduction device including a plurality of star-shaped apertures, each of which has a plurality of rectilinear sides or edges.

FIG. 13 depicts an isometric view of a portion of an example fluid pressure reduction device 1300 having a plurality of apertures 1302, each of which forms a generally star-shaped opening 1304. In the illustrated example, the star-shaped opening 1304 has a plurality of sides or edges that provide a relatively higher wetted perimeter-to-area ratio and a relatively lower control valve style modifier factor ($F_D$) than known apertures (e.g., square and circular apertures) while occupying substantially the same amount of total surface area (e.g., the sum of the shape surface area 910 and the surrounding surface area 912 of FIG. 10) as the total surface areas occupied by those known apertures. For star-shaped apertures having an odd number of vertices, some of the apertures may be configured or arranged in a substantially non-inverted configuration and others of the apertures may be formed in a substantially inverted configuration relative to the non-inverted apertures.

The apertures 1302 may be arranged in an interfitted (e.g., interlocked) puzzle-like pattern configuration to form a relatively large quantity of the plurality of apertures 1302 on the example fluid pressure reduction device 1300. Although, the apertures 1302 are shown as having generally star-shaped openings 1304 having particular dimensions and proportions, other dimensions and/or proportions may also be implemented.

Figure 14:
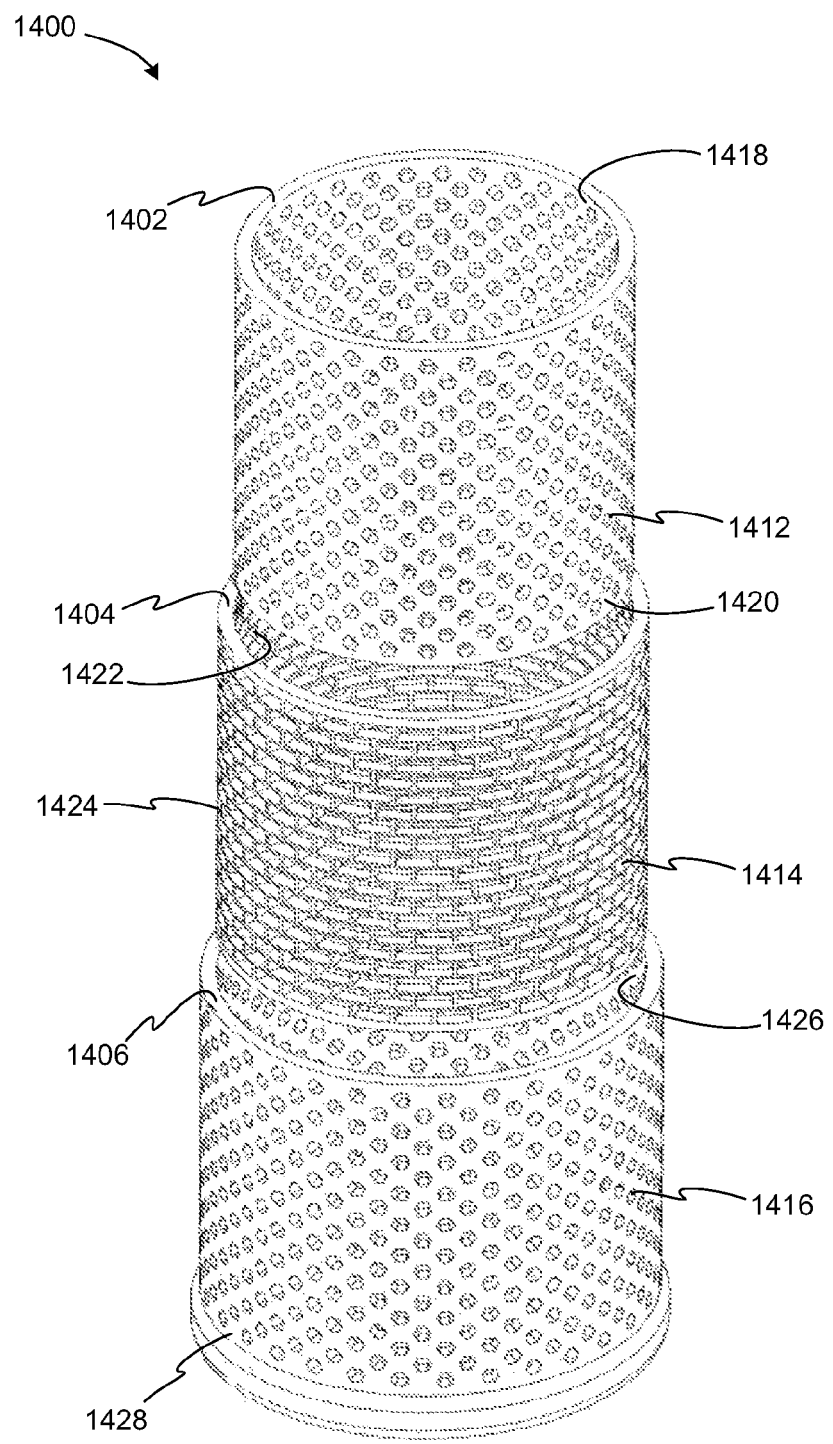
FIG. 14 depicts an exploded isometric view of an example fluid pressure reduction device including a plurality of nested cylinders that form a plurality of passageways, each of which includes at least two differently shaped apertures.

FIG. 14 depicts an exploded isometric view of an example fluid pressure reduction device 1400 formed using a plurality of nested cylinders. As shown, the example fluid pressure reduction device 1400 includes a first cylinder 1402 disposed within a second cylinder 1404, which is disposed within a third cylinder 1406. In the illustrated example, a first plurality of hexagonal apertures 1412 are formed in the first cylinder 1402, a second plurality of rectangular apertures 1414 are formed in the second cylinder 1404, and a third plurality of hexagonal apertures 1416 are formed in the third cylinder 1406. In an example implementation, the apertures 1412 of the first cylinder 1402 operate as inlet stages, the apertures 1414 of the second cylinder 1404 operate as plenums and the apertures 1416 of the third cylinder 1406 operate as outlet stages. Additionally, fluid pressure reduction devices can be constructed using more or fewer cylinders and/or apertures having different shapes. For example, the apertures of a first cylinder may be crescent-shaped, the apertures of a second cylinder may be star-shaped, the apertures of a third cylinder may be dodecagonal, and the apertures of a fourth cylinder may be hexagonal.

Returning to FIG. 14, the first cylinder 1402 includes a first cylinder inner surface 1418, a first cylinder outer surface 1420, and a plurality of radial passageways extending from the first cylinder inner surface 1418 to the first cylinder outer surface 1420 forming the hexagonal apertures 1412. The second cylinder 1404 includes a second cylinder inner surface 1422, a second cylinder outer surface 1424, and a plurality of radial passageways extending from the second cylinder inner surface 1422 to the second cylinder outer surface 1424 the rectangular apertures 1414. The third cylinder 1406 includes a third cylinder inner surface 1426 and a third cylinder outer surface 1428 having a plurality of passageways that extend from the third cylinder inner surface 1426 to the third cylinder outer surface 1428 forming the hexagonal apertures 1416.

The example cylinders 1402, 1404, and 1406 are arranged so that the plurality of apertures 1412, 1414, and 1416 form pre-determined flow paths through the example fluid pressure reduction device 1400. In the illustrated example, the example fluid pressure reduction device 1400 is formed by nesting, fitting, or pressing the second cylinder 1404 within the third cylinder 1406, and nesting, fitting, or pressing the first cylinder 1402 within the second cylinder 1404. In this manner, a substantial portion of the first cylinder outer surface 1420 abuts with, is in contact with, is mechanically coupled to, and/or is engaged with a substantial portion of the second cylinder inner surface 1422. Additionally, the second cylinder outer surface 1424 is adjacent to the third cylinder inner surface 1426 so that a substantial portion of the second cylinder outer surface 1424 abuts with, is in contact with, is mechanically coupled to, and/or is engaged with a substantial portion of the third cylinder inner surface 1426.

The apertures 1412, 1414, and 1416 are at least partially aligned with one another to form flow paths between the first cylinder 1402 and the third cylinder 1406 to enable fluid to flow from the inner surface 1418 of the first cylinder 1402, through the fluid pressure reduction device 1400, and toward the outer surface 1428 of the third cylinder 1406. One of ordinary skill in the art will readily appreciate that a process fluid may also flow from the outer surface 1428 of the third cylinder 1406 to the inner surface 1418 of the first cylinder 1402.

While the example fluid pressure reduction device 1400 is depicted as having three cylinders (e.g., the example cylinders 1402, 1404, and 1406 of FIG. 14) and hexagonal and rectangular aperture geometries, alternative implementations may use more or fewer cylinders and have any number of apertures with any desired geometry and position to form any desired flow path configurations.

Figure 15A:
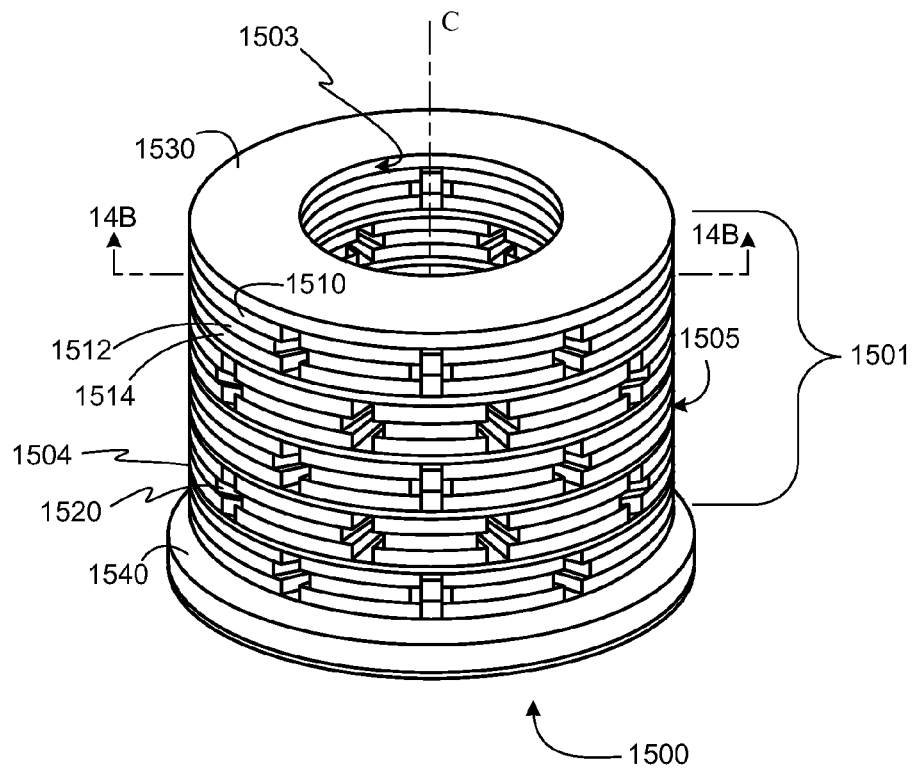
FIG. 15A depicts an isometric view and FIG. 15B depicts a top cross-sectional view of an example fluid pressure reduction device formed using a plurality of stacked discs and having a plurality of dodecagonal apertures.
Figure 15B:
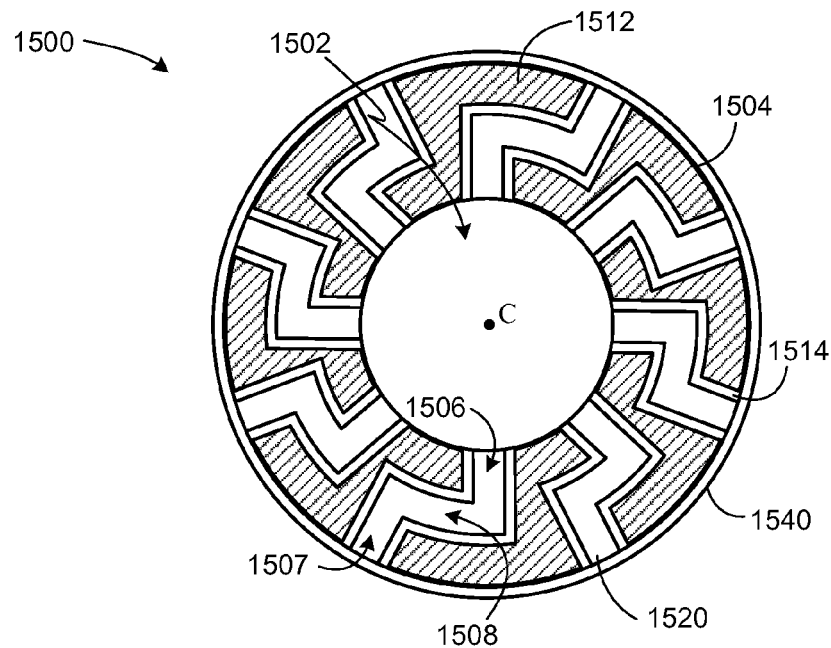

FIG. 15A illustrates an isometric view and FIG. 15B illustrates a top view of an example fluid pressure reduction device 1500 that is formed using a plurality of stacked disks 1501. Each disk 1501 includes a perimeter 1504 and a hollow center 1502 as shown in FIG. 15B. As shown in FIG. 15A, the disks 1501 are stacked and aligned along a longitudinal axis C to form an inner surface 1503, an outer surface 1505, a top surface 1530, and a flange 1540 of the fluid pressure reduction device 1500. The stacked disks 1501 form a plurality of passageways extending between the inner surface 1503 and the outer surface 1504. As shown in FIG. 15B, each passageway may include an inlet section 1506, an outlet section 1507, and an intermediate section 1508 extending between the inlet and outlet sections 1506 and 1507. The inlet and outlet sections 1506 and 1507 form cross-shaped, dodecagonal apertures 1520 shown in FIG. 15A.

In the illustrated example, the dodecagonal apertures 1520 are formed using a plurality of three-disk stacks. One of the three-disk stacks includes an upper disk 1510, an intermediate or interposing disk 1512, and a lower disk 1514. The upper and lower disks 1510 and 1514 may form respective square cross-sectional areas having equal dimensions and forming the upper and lower portions of the aperture 1520. The intermediate disk 1512 forms an area having a rectangular cross-section that may have, for example, twice the cross-sectional area of either of the rectangular cross-sectional areas corresponding to the upper and lower disks 1510 and 1514. Symmetrically positioning the upper and lower disks 1510 and 1514 above and below the intermediate disk 1512 forms the cross-shaped, dodecagonal apertures 1520. Although, the plurality of apertures 1520 are shown as forming generally cross-shaped openings having particular dimensions and proportions, apertures having differently shaped openings having other dimensions and/or proportions may also be implemented using multiple stacked-disk configurations while providing relatively high wetted perimeter-to-area ratios and relatively low control valve style modifier factors ($F_D$) to reduce fluid noise.

Alternate methods for manufacturing the example embodiment illustrated in FIGS. 15A and 15B may be considered within the scope of the present disclosure. For instance, U.S. Pat. No. 6,701,957, the specification of which is incorporated by reference, issued on Mar. 9, 2004, and assigned to Fisher Controls LLC, discloses an example method for fabricating an example fluid pressure reduction device by using a plurality of disks. Each of the disks is formed using a plurality of blank pieces (e.g., spiral-shaped pieces) held together using a bridge such as, for example, an inner ring at the hollow center of each disk to facilitate assembling the disks. In this manner, the inner ring may hold the blank pieces in position while the disks are stacked and secured together with relative ease. The hollow center of the fluid pressure reduction device is formed to its final diameter by removing the inner ring using any known means such as, for example, honing, grinding, or machining. Alternatively or additionally, the disks may be provided with outer rings or one or more tabs extending between adjacent blank pieces to position or hold disks during fabrication.

In alternative example implementations of the stack disk device 1500 in FIG. 15B, the dodecagonal passageways 1520 may be used to form tortuous flow paths. Tortuous flow paths may be implemented by abruptly changing flow path direction, as illustrated in FIG. 15B, or by mixing flow paths and/or subdividing flow paths into smaller flow paths (not shown). The tortuous paths create a viscous drag on the fluid that, in turn, reduces the fluid energy in the fluid flowing through the tortuous paths. Thus, the velocity of the fluid flowing through the tortuous paths decreases as the fluid progresses toward the fluid outlets, thereby substantially reducing fluid pressure as the fluid exits the fluid outlet at the perimeter of the disks. In another alternative implementation, flow passageways may be formed between two disks of the stacked disk device by forming a portion of the passageway on each individual disk surface such that the solid bottom surface of an upper consecutive disk forms the top portion of a passageway with respect to the lower disk that includes the bottom portion of the passageway.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A fluid pressure reduction device comprising:
   a plurality of nested cylinders forming a hollow structure comprising an inner surface and an outer surface; and
   a plurality of passageways extending between the inner and outer surfaces through the nested cylinders, at least one of the cylinders including first apertures substantially differently shaped from second apertures in a second one of the cylinders, and at least one of the first apertures having a first wetted perimeter that is greater than a second wetted perimeter of another one of the apertures having the same area as the at least one of the first apertures.

2. A fluid pressure reduction device as defined in claim 1, wherein the other one of the apertures is one of a circle-shaped aperture or a rectangle-shaped aperture.

3. A fluid pressure reduction device as defined in claim 1, wherein the first apertures being substantially differently shaped from the second apertures comprises the first apertures having a geometric shape different from the second apertures.

4. A fluid pressure reduction device comprising:
   a plurality of nested cylinders forming a hollow structure comprising an inner surface and an outer surface; and
   a plurality of passageways extending between the inner and outer surfaces through the nested cylinders, at least one of the cylinders including first apertures substantially differently shaped from second apertures in a second one of the cylinders, and at least one of the first apertures having a first wetted perimeter that is greater than a second wetted perimeter of another aperture having the same area as the at least one of the first apertures, wherein the first apertures being substantially differently shaped from the second apertures comprises the first apertures having a polygonal shape and the second apertures having a non-polygonal shape.

5. A fluid pressure reduction device comprising:
   a plurality of nested cylinders forming a hollow structure comprising an inner surface and an outer surface; and
   a plurality of passageways extending between the inner and outer surfaces through the nested cylinders, at least one of the cylinders including first apertures substantially differently shaped from second apertures in a second one of the cylinders, and at least one of the first apertures having a first wetted perimeter that is greater than a second wetted perimeter of another aperture having the same area as the at least one of the first apertures, wherein the first apertures are hexagonal-shaped apertures and the second apertures are rectangle-shaped apertures.

6. A fluid pressure reduction device as defined in claim 1, wherein the at least one of the cylinders including the first apertures abuts the second one of the cylinders having the second apertures.

7. A fluid pressure reduction device as defined in claim 1, wherein adjacent ones of the first apertures are in an offset configuration relative to one another.

8. A fluid pressure reduction device as defined in claim 1, wherein the first apertures are partially aligned with the second apertures.

9. A fluid pressure reduction device as defined in claim 4, wherein the other aperture is one of a circle-shaped aperture or a rectangle-shaped aperture.

10. A fluid pressure reduction device as defined in claim 4, wherein the at least one of the cylinders including the first apertures abuts the second one of the cylinders having the second apertures.

11. A fluid pressure reduction device as defined in claim 4, wherein adjacent ones of the first apertures are in an offset configuration relative to one another.

12. A fluid pressure reduction device as defined in claim 4, wherein the first apertures are partially aligned with the second apertures.

13. A fluid pressure reduction device as defined in claim 5, wherein the other aperture is one of a circle-shaped aperture or a rectangle-shaped aperture.

14. A fluid pressure reduction device as defined in claim 5, wherein the at least one of the cylinders including the first apertures abuts the second one of the cylinders having the second apertures.

15. A fluid pressure reduction device as defined in claim 5, wherein adjacent ones of the first apertures are in an offset configuration relative to one another.

16. A fluid pressure reduction device as defined in claim 5, wherein the first apertures are partially aligned with the second apertures.

* * * * *